Sept. 1, 1964 R. B. ABBOTT ETAL 3,147,105
APPARATUS FOR MOLDING GLASS
Original Filed July 25, 1957 9 Sheets-Sheet 1
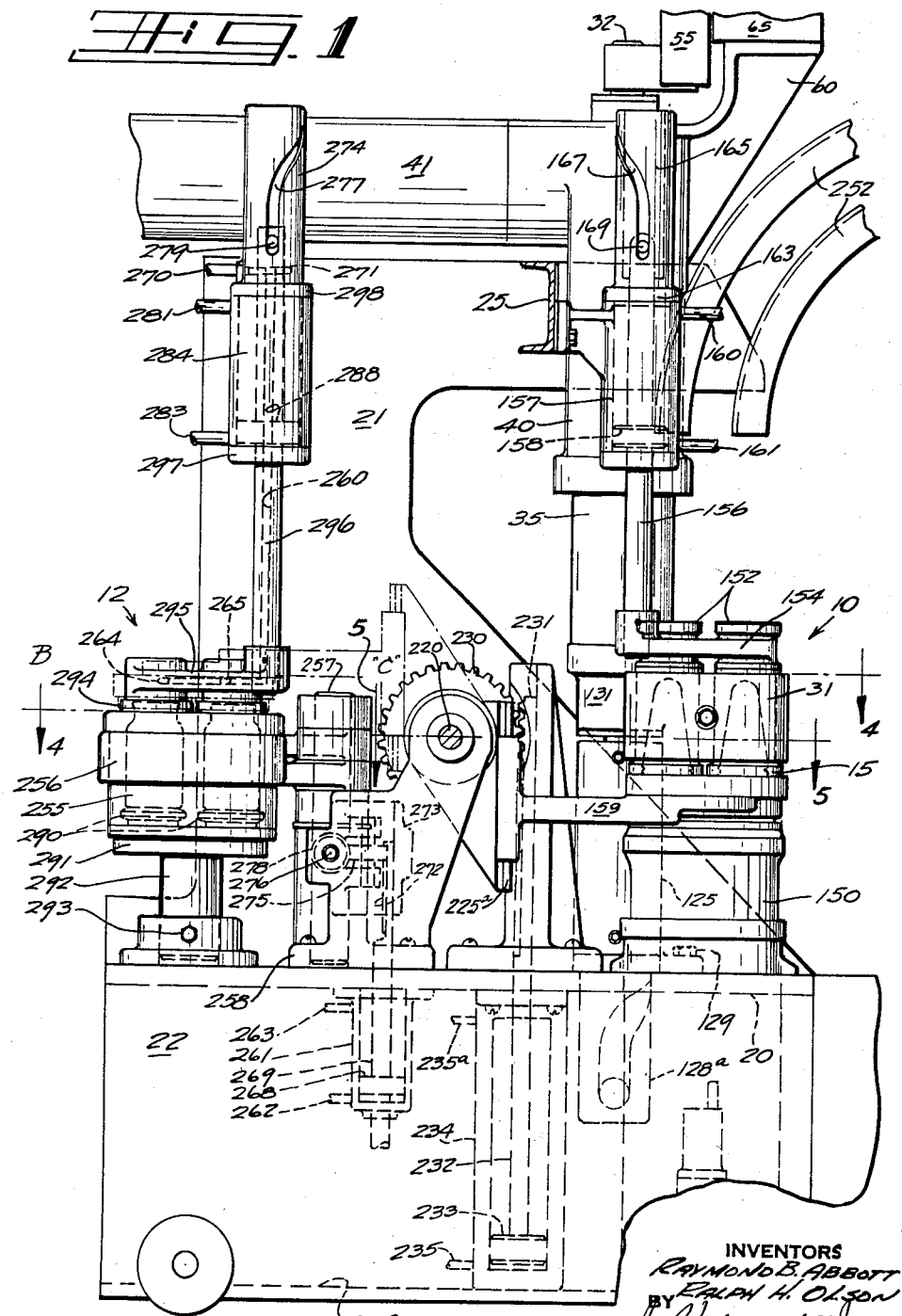
INVENTORS
RAYMOND B. ABBOTT
RALPH H. OLSON
BY
J. R. Nelson & O. T. Innis
ATTORNEYS Sept. 1, 1964 R. B. ABBOTT ETAL 3,147,105
APPARATUS FOR MOLDING GLASS
Original Filed July 25, 1957 9 Sheets-Sheet 2
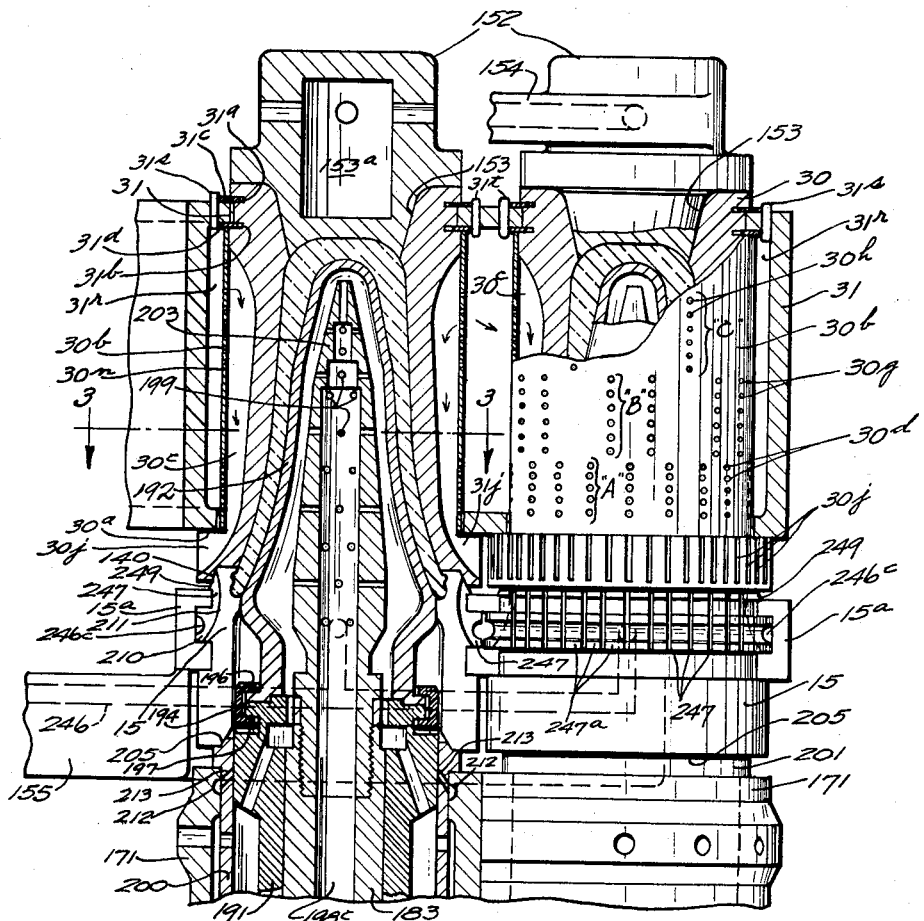
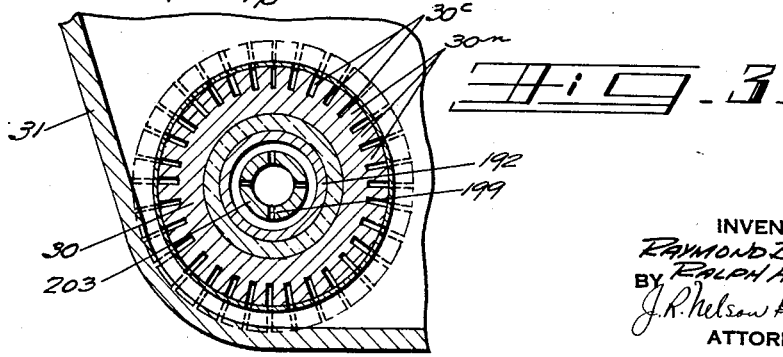
INVENTORS
RAYMOND B. ABBOTT
RALPH H. OLSON
BY J. R. Nelson & D. T. Innis
ATTORNEYS

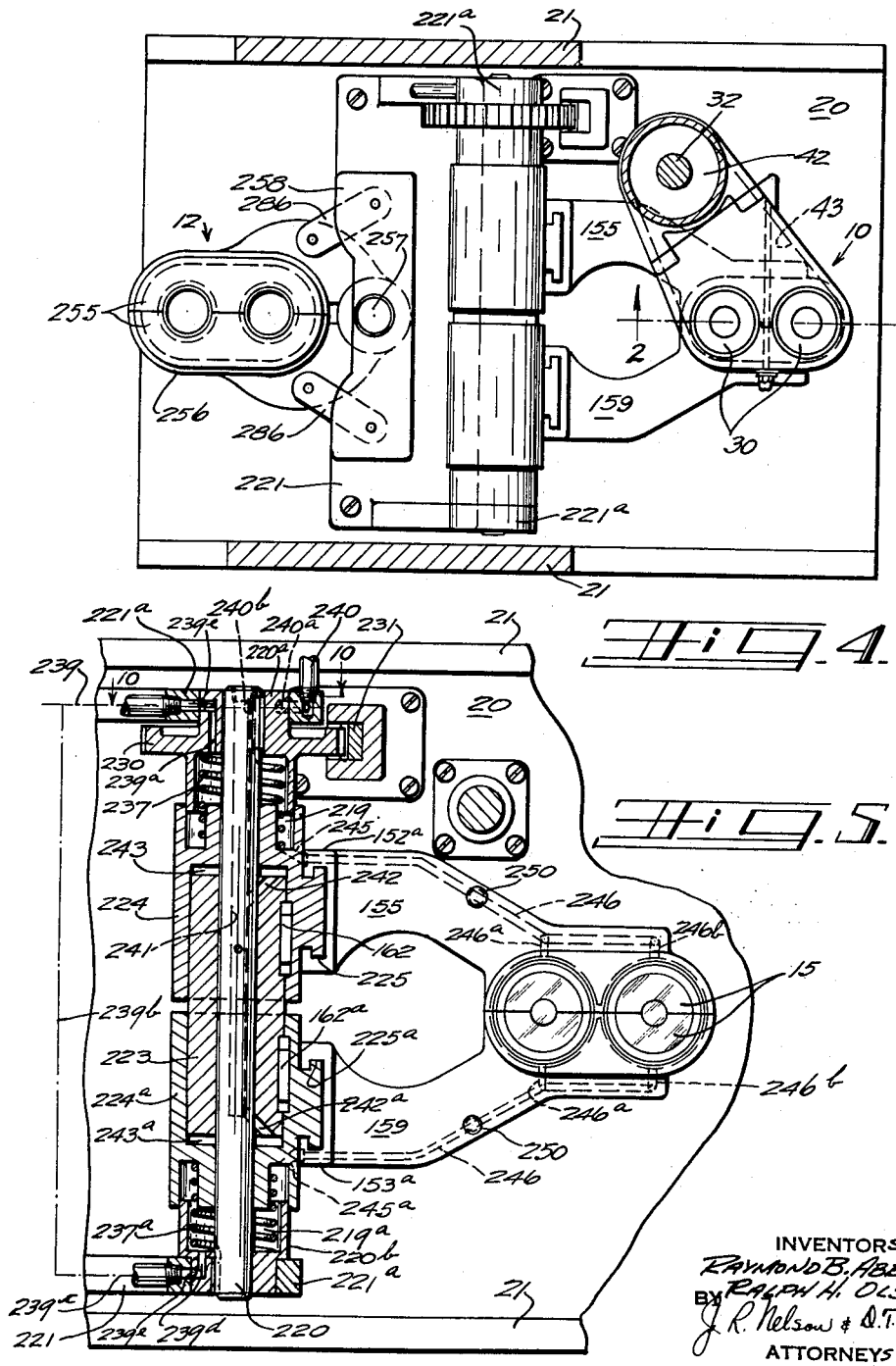

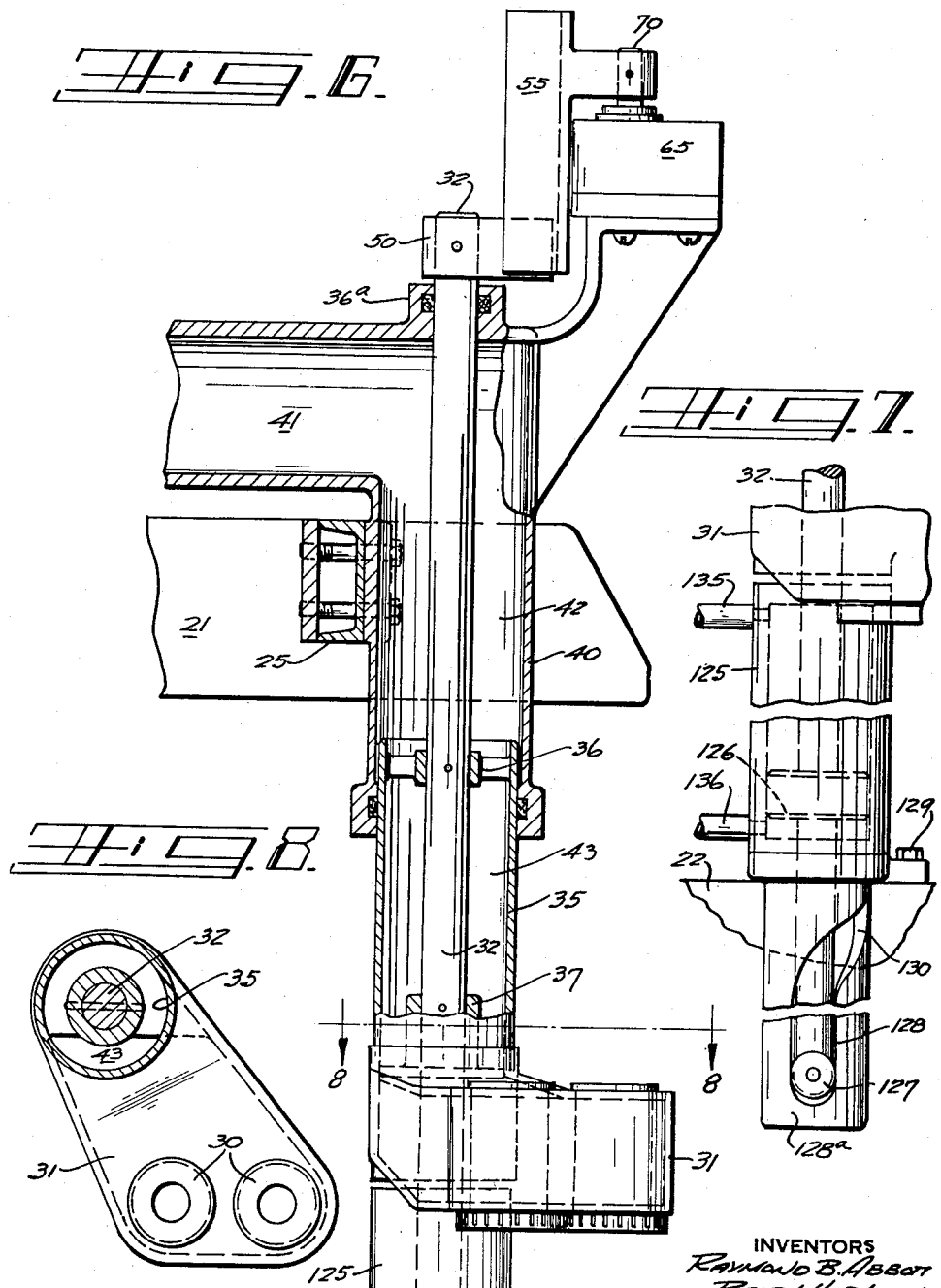

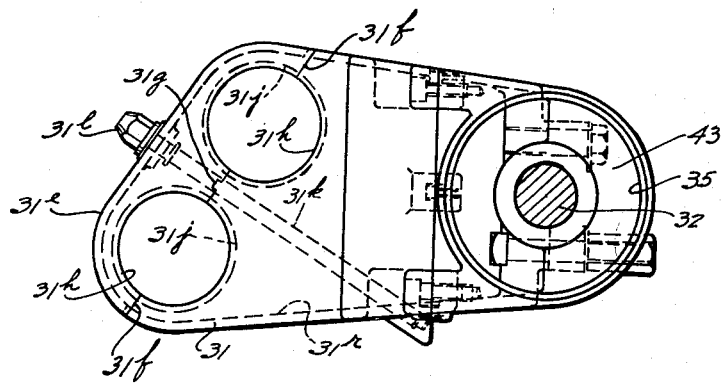
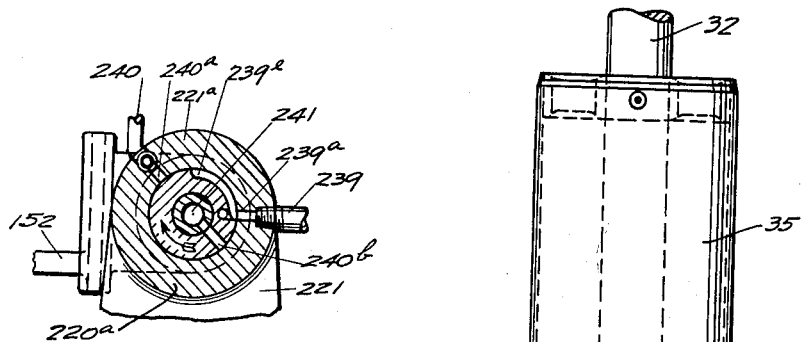

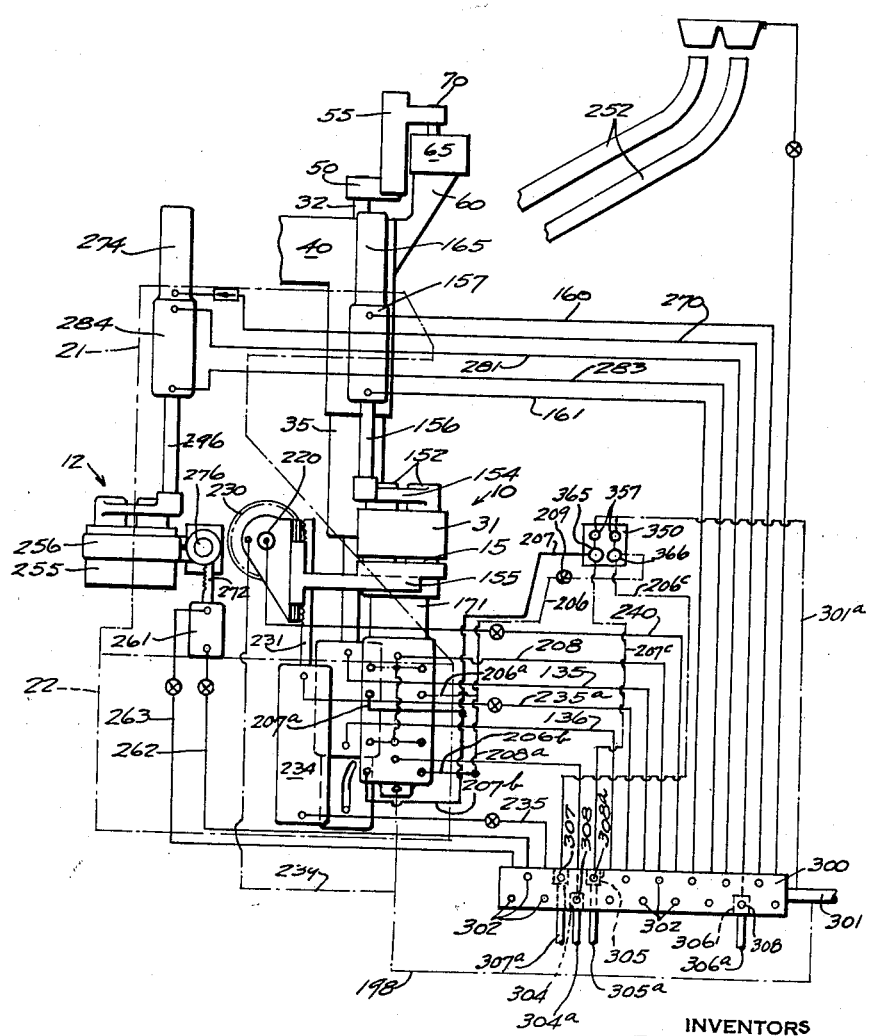

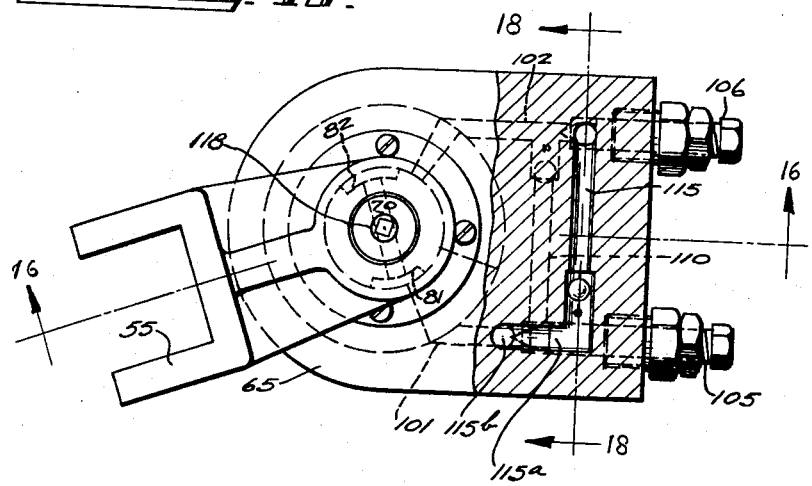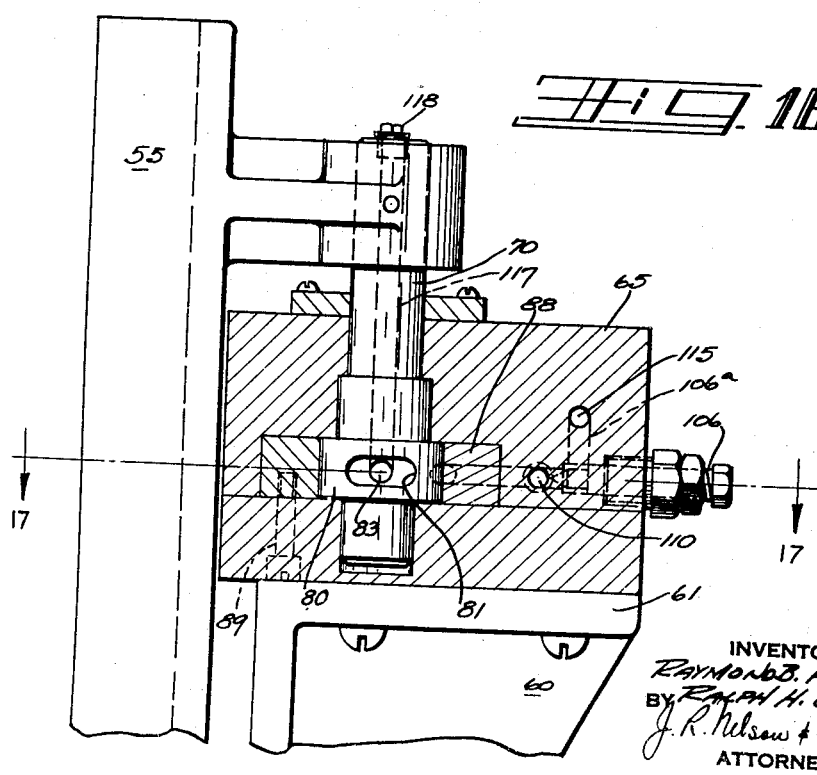

Sept. 1, 1964   R. B. ABBOTT ETAL   3,147,105
APPARATUS FOR MOLDING GLASS
Original Filed July 25, 1957   9 Sheets-Sheet 9
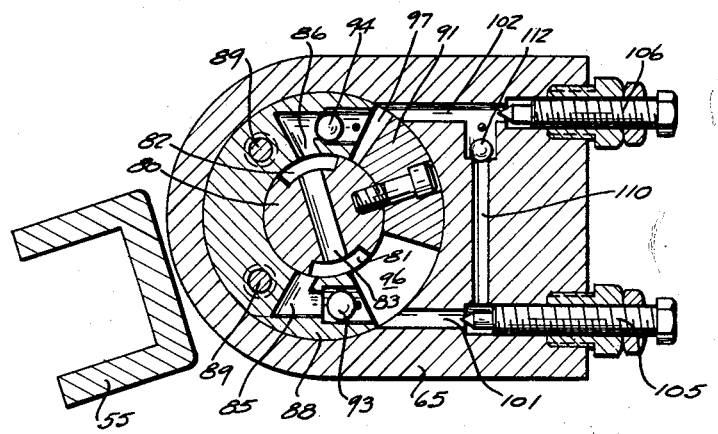
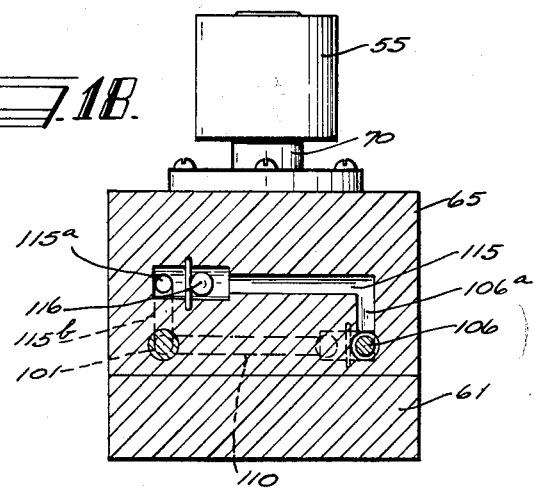
INVENTORS
RAYMOND B. ABBOTT
BY RALPH H. OLSON
J. R. Nelson & D. T. Junio
ATTORNEYS

United States Patent Office 3,147,105
Patented Sept. 1, 1964

3,147,105
APPARATUS FOR MOLDING GLASS
Raymond B. Abbott, Toledo, Ohio, and Ralph H. Olson, Geneva, Switzerland, assignors to Owens-Illinois Glass Company, a corporation of Ohio
Original application July 25, 1957, Ser. No. 674,149, now Patent No. 3,024,571, dated Mar. 13, 1962. Divided and this application Aug. 14, 1961, Ser. No. 131,260
2 Claims. (Cl. 65—361)

Our invention relates to the molding of molten glass into hollow shaped articles and in particular relates to the pressing and blowing method of producing glass articles.

This application is a divisional of our copending application Serial No. 674,149, filed July 25, 1957, now Patent No. 3,024,571.

The glass industry has recognized the troubles inherent in the operation of two-piece, open and shut molds since the advent of the automatic machine. In such molds the matching seams are difficult to maintain, both in the mold equipment and the machine parts which carry the molds. Further, such matching surfaces form a material heat barrier or block and presents an uneven heat or temperature unbalance which is imposible to overcome.

On the well-known "IS" machine, these troubles have compounded themselves in recent years. With the application of the well-known "62" process (Rowe, 2,289,046) to said machine and the trend to lightweight ware and higher speeds, these problems have been further increased.

In order to offset these difficulties this present invention contemplates the provision of a new type of parison mold.

In essence this apparatus concerns the press molding of a parison or blank of molten glass, either singly or in pairs, and the use of an inverted seamless blank mold for forming same. Additionally, there is the usual blow molds positioned at a blowing station and an apparatus for transferring the shaped parisons from the blank forming station to the blowing station.

In the usual stationary section machines such as disclosed in the patent to Ingle, No. 1,911,119, the parisons are formed inverted, but their formation is accomplished by the usual blow and blow method rather than by the press and blow method. This present apparatus contemplates forming parisons in the inverted position by a press method and reverting these parisons during the transfer to the blow mold.

An object of the invention is the provision of a new type of seamless parison mold and a novel mounting therefor.

A further object is the provision of apparatus for reducing vibration of moving parts in a high speed operation.

Other objects will be in part apparent and in part pointed out hereinafter.

In the drawings:

FIG. 1 is an elevational view illustrating the mold arrangement and relationship of this forming machine;

FIG. 2 is a sectional elevation taken at line 2—2 on FIG. 4 through the blank mold head illustrating the plural blank mold structure and cooling devices;

FIG. 3 is a sectional plan view taken at line 3—3 on FIG. 2 which illustrates the mold wall structure with its cooling channels;

FIG. 4 is a plan view of the blank, neck and blow molds taken approximately at line 4—4 on FIG. 1;

FIG. 5 is a sectional view taken at line 5—5 on FIG. 1 and illustrates the neck mold fluid pressure closing mechanism;

FIG. 6 is a part sectional elevation of the blank mold raising and swinging device illustrating both the control of the swing of the blank mold and its holder and the cooling air channels therefor;

FIG. 7 is an elevational view of the lower end of the blank mold raising, lowering, and swinging mechanism;

FIG. 8 is a part sectional plan view of the blank mold and its holder;

FIG. 9 is a plan view of the blank mold holder illustrating its assembly structure;

FIG. 10 is a section taken at line 10—10 on FIG. 5 and illustrates the conduits for providing auxiliary pressure for closing the neck molds;

FIG. 11 is an elevational view of the blank mold holder structure;

FIG. 12 is a fluid piping diagram for the apparatus;

FIG. 15 is an enlarged, part sectional view of the snubber of FIG. 13;

FIG. 16 is a partial section taken at line 19—19 on FIG. 15;

FIG. 17 is a sectional view taken at line 20—20 on FIG. 16;

FIG. 18 is a section taken at line 21—21 on FIG. 15.

Figure 13:
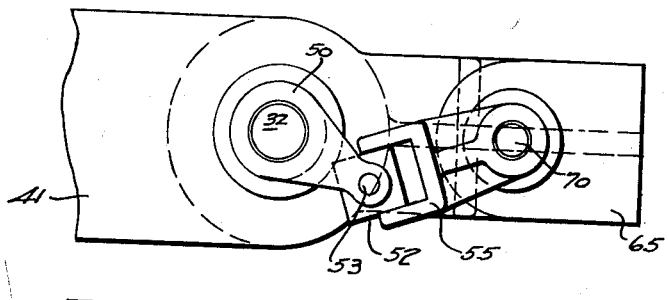
FIG. 13 is a plan view of the snubber structure for the parison mold.
Figure 14:
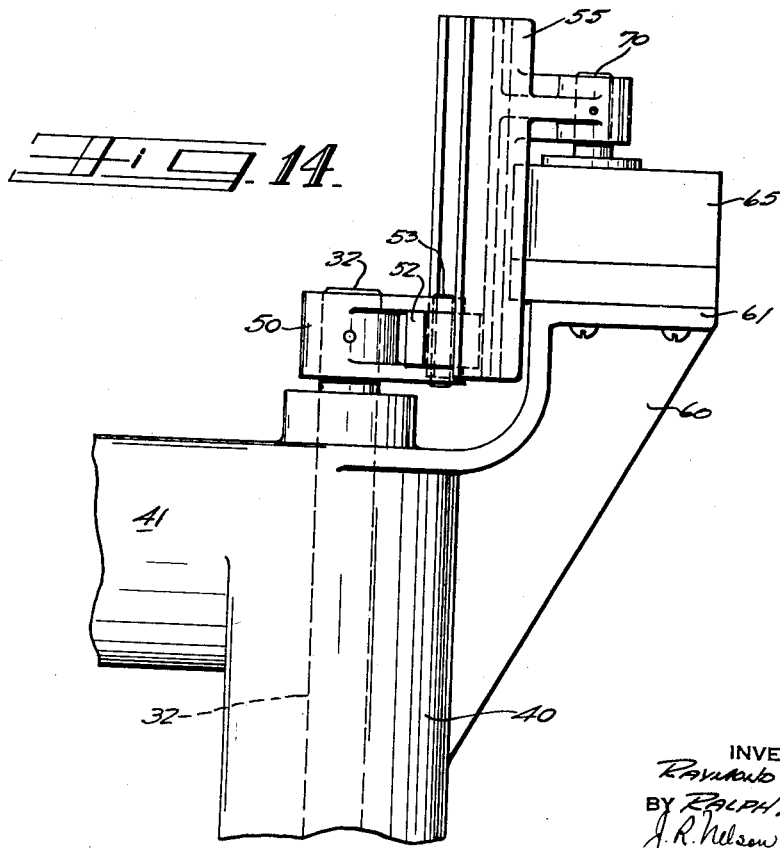
FIG. 14 is an elevational view of the snubber structure.

A glassworking machine embodying the present invention is illustrated as being a machine wherein each unit or section embodies a movable annular blank mold, a stationary partible blow mold, and a split neck mold adapted to cooperate alternately with the said blank mold and blow mold to transfer a blank or parison from the blank mold to the blow mold; a gob delivery mechanism "B" for successively supplying charges to each forming section; and a pressure control mechanism "C" for adjustably regulating the application of actuating fluid pressure to the several operating portions of said forming section, in proper sequence and in timed relation to each other and the gob feeding device.

This forming section may be provided as one of a series of units arranged either singly, in a straight line beneath the feeder orifice or disposed in some other arrangement about the vertical center line of the feeder orifice or in any desired geometric pattern. In addition these glass forming units may also be arranged upon a table for rotary movement beneath the gob feeder. With particular reference to FIG. 1, the forming section embodies an annular blank mold unit 10 which remains permanently in inverted position, but which is movable into and out of a parison forming position.

In this present disclosure the drawings illustrate a plural mold cavity structure, but of course the invention is applicable to a single mold structure.

A blow mold unit 12 of the split mold type is permanently disposed in neck-up position at the final blowing station, and a split neck ring 15 is adapted to swing about a horizontal axis from the blank or parison forming station to transfer and invert a parison into upright blowing position at the blow mold station for final blowing into a completed article. The mold units 10 and 12 and the neck ring holder 15a are supported upon a platform 20 which in turn is connected to and supported by upright frame structures 21 mounted upon a base 22. These frames 21 are interconected at their upper ends by a channel member 25. Each parison mold unit is comprised of a pair of annular unsplit shaping molds 30 mounted in a hollow holder 31 which is in turn mounted upon and attached to a vertical shaft 32. The hollow holder 31 is formed at one end in a hollow sleeve portion 35 having inner support bearings 36 and 37 attached to shaft 32. The sleeve portion 35 is adapted for telescopic movement in a hollow member 40 and thus provides a continuous conduit for cooling air from a source of supply (not shown) through channels 41, 42, and 43, to and around the molds 30 (FIGS. 1 and 8) for the cooling or temperature control thereof. This blank mold supporting member is of a specific structure which will be described in detail later on in this description.

The blank molds 30 and their support 31 are adapted for both vertical and horizontal motion, with the shaft 32, to bring them to the operative forming position and then to an inoperative position above and to one side of the operative position. The upper end of shaft 32 has mounted thereon and attached thereto a bracket 50 which carries in its outer end a pivot block 52 pivoted at 53 on said bracket 50. The pivot block 52 is adapted for vertical sliding movement in slide block 55.

A support bracket 60, formed as an extension of the vertical hollow member 40, provides a supporting base 61 upon which is mounted a cushion control block 65. The slide block 55 is mounted on and attached to a vertical pivot shaft 70 which in turn is mounted in the control block 65. This mounting permits the slide block 55 to pivot with shaft 70 for the following purpose.

The blank molds 30 are required to lift and swing about shaft 32 with great rapidity and in order to avoid the detrimental effects of the successive rapid starting and stopping of the swing of the molds an oil cushion control 65 has been provided which operates as a torque dampening means. The shaft 70 has formed thereon a shoulder 80 having formed in the opposite sides thereof extended ports 81 and 82. These ports are of equal dimension and are interconnected by a channel 83. Each port 81 and 82 is arranged to alternately register with channel 85 and 86 respectively formed in a stationary plate 88 locked to the control box 65 by screws 89 as shown in FIG. 17. A baffle blade 91 is attached to the rotary shoulder 80 of shaft 70 and oscillates with said shaft 70.

Check valves 93 and 94 are formed to cooperate with ports 85 and 86 respectively to control the flow of oil to and from chambers 96 and 97, formed between the blade 91 and plate 88, such flow from ports 85 and 86 being due to movement of blade 91. Channels 101 and 102 lead from chambers 96 and 97 respectively to bleeder needle valves 105 and 106 respectively.

An additional oil channel 110 interconnects channels 101 and 102 and has a check valve 112 therein which causes the exhaust oil from chamber 97 to pass through needle valve 106 to thus provide an oil cushion against which the blade 91 will work to cushion the swing of the mold holder 31 when the molds 30 are removed from their forming position. After passing needle valve 106, the oil then passes through conduit 106a into channel 115, check valve 116, channels 115a, 115b and 101 then into chamber 96.

The channel 110 also interconnects channels 101 and 102 and is adapted to control, through the restriction provided by check valve 116, the exhaust of oil from behind blade 91 in chamber 96 to cushion the swing of the molds 30 when they are moving to their operative position. Thus the oil will flow from chamber 96 through channels 101, needle valve 105, channels 110 and 102, into chamber 97. This structure permits oil to be freely sucked into the chambers 96 and 97 on one stroke and to be controlled in its rate of exhaustion as it is freed from said chambers on the opposite stroke. Oil is provided to this control block 65 through channel 117 and locked therein by plug 118.

Through the above mechanisms the mold support 31 with its molds 30 may be successively swung to and from its operative position to the inoperative position at very high speeds without detrimental vibration. The swinging, raising and lowering of the blank mold support 31 and the blank mold 30 is accomplished through a cylinder 125, a piston 126 attached to the piston shaft 32, a cam roll 127 formed on the lower end of shaft 32 and a control cam 128 formed in the cylinder head 128a attached to the lower end of cylinder 125. The cylinder 125 is mounted and retained on the base 22 by the bolts 129 (FIGS. 1 and 8). Suitable actuating pressure is supplied to cylinder 125 through pipes 135 and 136 to raise, lower and swing support 31 with its molds 30.

The upper end of piston shaft 32 extends upwardly through the telescopic member 35 and bearing 36a of conduit 40 and is then attached to the swing cushion control 65 through lever 50. This particular control mechanism has been previously described above.

The lower end of piston shaft 32 extends through and is slidably mounted in the cylinder head 128a formed as a part of cylinder 125.

As the piston 32 moves from the position shown in FIG. 8, under the influence of pressure supplied through pipe 136, to raise and swing the blank molds 30, the cam 128 acting on cam roll 127 permits the mold support 31 and molds 30 to first move straight up until the curved section 130 causes the shaft 32 to rotate and swing the mold support 31 laterally out of the path of the oscillating neck rings 15, the construction and operation of which will be hereinafter described. As the shaft 32 rotates, its connection with the cushion control 65 is actuated to cushion the end of the rotation and prevent vibration of these mold parts. When the piston stroke is reversed the molds 30 and support 31 swing into operative position over and in register with the neck molds 15.

During the charging of the blank molds 30 at the parison forming station, the neck molds 15 occupy a position beneath and in registered contact with the blank molds 30. This registration is obtained and maintained by the mating angular surface areas 140 (FIG. 2) so that each blank mold 30 accommodates itself to the position of its respective neck ring 15. The neck molds 15 are of the split type and the halves thereof are carried upon support arms 155 and 159. These neck molds 15 are so mounted upon their respective supports as to have little if any, horizontal or sliding motion thereon. The blank molds 30 are movable in any direction with respect to their support 31. Reference to FIG. 2 will show that the blank molds 30 can move horizontally with respect to support 31 due to the clearance provided at 31a and 31b. Guide plates 31c and 31d attached to the top end of support 31 retain the molds 30 in the support but permit limited relative movement therebetween in both the vertical and horizontal planes as will be more fully disclosed hereinafter.

Formation of parisons in this present mechanism is accomplished by the well-known press method. The charges of glass being provided by the usual glass feeding device and directed to the parison molds 30 through gob chutes 252 and 252a adapted to guide the charges to and through the open upper ends of the blank molds 30. Concurrent therewith, but following the charging of the molds, baffle plates 152, mounted on an arm 154, are swung about shaft 156, through activation provided by cylinder 157 and cam 167 and brought into registration with and seated upon the molds 30.

The pressing of the gobs of molten glass to form blanks or parisons is obtained through a vertical, fluid pressure twin cylinder unit (FIG. 2) mounted upon the base 22, below and in alignment with the blank and neck molds 30 and 15 respectively, at the charging position of the machine. When the blank molds 30 are in forming position, as shown in FIGS. 1, 4 and 12, the open upper end thereof is adapted to be closed by a cover or baffle plate 152 which is shaped to fit within complementary depressions 153, formed in the upper end of the blank molds 30. The baffle plates 152 are provided with internal cavities 153a into and through which cooling fluid may be passed.

The arm 154 which supports the baffles 152, is secured to the lower end of a vertically reciprocable piston rod 156, which extends upwardly through a fluid pressure cylinder 157 and is provided with a piston 158 (FIG. 2). The cylinder 157 is suitably mounted on the cross channel 25 and is supplied with valve controlled fluid under pressure through pipes 160 and 161, in order to raise and lower the baffles or cover plates 152 with respect to the blank molds 30.

The upper portion of the piston rod 156 extends through and is slidably mounted in an upper cylinder head 163, formed with an upwardly extending cam sleeve 165. This sleeve functions as a protective housing for the top portion of the piston rod 156, and is provided with a helical slot 167 into which projects a cam pin 169 carried by the piston rod 156. As the piston moves upwardly, under the pressure admitted through pipe 161, to elevate the mold baffles 152, the cam slot 167, acting on the pin 169, imparts a partial rotation to the rod 156 which is sufficient to swing the baffles 152 in a lateral direction and out of the path of the oscillating neck rings 15. Upon the downward stroke of piston 158, the baffles 152 will return to closing position in cooperation with the blank molds 30.

During the mold charging and blank forming operations, the neck rings 15 occupy a position beneath and in alignment with the blank molds 30 (FIGS. 1, 2, and 5) and are provided on their upper ends with an angular surface area 140 which is adapted to cooperate with complementary recesses in the lower ends of the blank molds 30, thereby maintaining an exact registration between the neck rings 15 and blank molds 30 during the blank forming operations.

The neck mold inverting mechanism is shown in FIGS. 1, 4 and 5. This mechanism is comprised of a pair of support arms 155 and 159 fulcrumed on a shaft 220 mounted in bearings 221a formed on bearing bracket 221. The bearings 221a support the shaft 220 in a horizontal position. The shaft 220 is provided with an enlarged portion 223, upon which is mounted a pair of sleeves 224 and 224a, each sleeve adapted for both rotary motion with and sliding movement along the length of shaft 220. Each sleeve is provided with a slideway 225 and 225a formed thereon in such a manner that when the neck molds are in either of their two operative positions, these slideways will be disposed in a vertical plane. The arms 155 and 159 are also provided with slide formations 152a and 153a adapted to cooperate with the slideway portions 225 and 225a of the sleeves 224 and 224a. This slide and slideway structure will permit the neck rings 15 to be adjusted vertically at either of the operative positions to bring the neck rings 15 into proper cooperative vertical position with respect to either the tapered formation 205 on the upper end of the plunger cylinder sleeve 200 or into proper vertical position with respect to the top surface of the blow molds 12. The rotation of the neck mold arms 155 and 159 about the axis of shaft 220 to transfer the parisons from their forming station to the blowing station is accomplished through a pinion 230 and a vertically disposed pinion rack 231 positioned in meshing contact with the pinion 230. The rack 231 is formed on the upper end portion of a piston rod 232, attached to a piston 233 and adapted for vertical movement in a cylinder 234. Air inlet pipes 235 and 235a are adapted to permit pressure air, under valve control, to enter the cylinder 234 at the bottom and top ends thereof respectively.

Continuous pressure air is supplied from conduit 239 to channels 239a, 239b, 239c, and 239d into chambers 219 and 219a when the neck mold arms 155 and 159 are in the position shown in FIGS. 5 and 6 to insure holding the neck rings 15 closed against the glass pressing pressure. After the pressing operation is completed and the transfer of the parison is in progress, this air pressure may be and generally is continued through at least a portion of the transfer movement for cooling purposes.

When the neck molds 15 carying the parisons, are rotated and reach the blowing station, it then becomes necessary to open these neck rings 15 and release the parisons to the control of the blow molds 12. This opening of the neck rings releases the parison to the confines of the blow mold 12 which has been closed just prior to the release of the parison. The piston 233 of the transfer cylinder 234 is then subjected to air under pressure admitted through pipe 235a to return the neck rings 15 to the parison forming position. During this returning motion, the pressure in chamber 243 and 243a will be released, the springs 237 and 237a will then cause the neck rings to close.

In order that high speed production may be obtained and maintained it is, of course, necessary that the several molds be cooled during the forming operation and in particular the neck rings 15 should be cooled during the molding operation because with this particular mechanism, the glass forming molds are being utilized at exceptionally high speeds. For example, at speeds approximately four times faster than is normally accomplished with similar mechanisms.

The hollow mold support member 31 (FIG. 2) is adapted to support one or more annular blank molds 30 and in this present instance, two blank molds are shown. Each single piece annular parison mold 30 is provided, at its upper end, with a pair of grooves 31a and 31b into which are fitted opposed thin semi-circular rings 31c and 31d. These split rings are retained in their operative positions by means of a series of retaining pins 31s and 31t. The width of the grooves 31a and 31b is greater than that of the rings 31c and 31d and the vertical spacing between the grooves is greater than the thickness of the top surface of the mold holder 31. The vertical spacing between the rings 31c and 31d and the lower shoulder 30a of each mold 30 is greater than the height of the mold holder 31. These excess dimensions thus permit the molds 30 to have limited freedom of vertical movement with respect to the holder 31 when or at the time molds 30 are seated upon the neck molds 15.

When the neck rings 15 are actuated, as heretofore described, to transfer the formed parisons to the finish blowing station, the parisons are deposited in the open blow mold 12 in a neck-up position. The blow mold 12 (FIGS. 1 and 4) in the present instance, is at a fixed station and comprises two cooperating sections 255 which are detachably secured to mold holders 256. The mold holders are hinged upon a pin 257 which is carried by housing 258 having trunnions 259 provided at each end thereof, and which are secured to the side frame elements 260.

The blow mold halves 255 open and close at proper times by means of fluid pressure which is admitted to a vertically disposed cylinder 261 (FIG. 1) through pipes 262 and 263. These pipes lead respectively from valves by means of which the flow of pressure delivered to the cylinder 261 may be regulated as desired. The cylinder is mounted on the base 20 of the machine and is provided with a piston 268 which is carried by a piston rod 269. The piston rod 269 extends entirely through and is slidably mounted in both of the heads of the cylinder 261 and is provided at its upper end with a rack bar 272. This rack bar is slidably mounted in the housing 273 and meshes with a spur gear 275 which is fixed to a horizontal shaft 276. The shaft 276 is provided with spiral gears 278, which mesh with spiral gears connected to drive a crank connected to the blow mold holders 256 by means of links 286 (FIG. 4) and together form a toggle to lock the mold sections in a closed position during the blowing operation.

The lower portion of the blow mold is closed by bottom plates 290 which are supported by a holder 291. This holder is adjustably mounted on a support 292 carried by the base 22 of the machine. The bottom plate 290 may be adjusted vertically with respect to the blow mold by loosening the clamp 293.

The upper portion of the blow mold is adapted to be closed by blow heads 294, which are detachably secured to a hollow arm 295 by any suitable connection, such as a bayonet joint connection.

In FIG. 1, the blow head 295 is shown as contacting the top of the blow mold 12 during the finish blowing operation, the neck ring 15 having been returned to the blank forming station. By this arrangement, the blowing operation may overlap the succeeding blank forming operation, thus permitting the ware to remain in the blow mold for relatively longer interval of time.

The fluid pressure control mechanism "C" as shown in FIG. 12 is approximately the same as that shown in the Ingle patent, No. 1,911,119, previously mentioned.

In the operation of the apparatus described above, mold charges of molten glass are delivered by a feeder through the funnel 252a and are received in succession by the trough sections 252 and delivered into the blank molds 30. The machine then proceeds through the control provided by a timing cam drum to fabricate the mold charges which it receives, first by applying a pressing action to the glass in the combined neck and blank molds 15 and 30, then stripping the blank mold, and swinging the bare parison by the neck rings 15 to an upright position at the finish blowing station during which time the parisons are permitted to reheat, then closing the blow mold 12 and finish blowing the ware, and finally opening the blow mold 12 to release the ware.

The cycles of operation may be so arranged that the blow molds are active almost continuously. That is to say, the ware may be taken out of each blow mold immediately before fresh parisons are delivered thereto by the neck rings. The parison mold may be kept in operation almost continuously because the cooling of the neck rings 15 and parison molds 30 is a continuous operation, and as soon as the parisons are transferred to the blow mold 12 and the neck rings 15 returned to the blank forming station, the blank molds 30 are then in a temperature condition to immediately receive another charge for the pressing of succeeding parisons for subsequent transfer to the blow mold 12 during the time that the parisons previously formed in the same blank molds are being blown to final form in the associated blow mold 12. When the parisons are formed, the blank mold is stripped from the parisons, leaving the bare parisons supported in inverted position by the neck rings 15.

The stripping movements of the parison molds 30 are concurrent with the transfer movements of the neck molds 15. For example, as the mold holder 31 and molds 30 move directly, vertically upward away from the inverted shaped parisons, they move in a straight vertical line for a certain distance and then swing horizontally while continuing the vertical movement. At the instant of completion of the horizontal swing of the blank molds 30 or just slightly before, the neck molds 15 start to swing upwardly and around the fulcrum shaft 220 to the blow mold position. At this point the blow mold 12 closes about the parisons, the neck rings 15 open and swing back to the press position and the parison molds 30 swing down upon and in register with the neck rings 15. During the preceding operations both the neck molds and the parison molds are being cooled.

This practically continuous operation of the blank and blow molds renders it possible to press the parisons in the blank molds during the time that the parisons previously pressed in the same blank molds are being blown to final form in the associated blow mold and because these molds 15 and 30 are designed for high speed cooling and are efficiently and continuously cooled in a vertically spaced type of zonal cooling they may be successively and rapidly used for forming parisons at extremely high speeds.

From the foregoing it will be apparent that a relatively simple molding system has been devised and utilized.

Modifications may be resorted to within the spirit and scope of the appended claims.

We claim:

1. The combination of a glass forming mold, a mold holder supporting the mold, a vertical shaft mounted for vertical and oscillatory movement and connected to said mold holder, power means connected to said shaft for raising and lowering the shaft, cam means associated with said shaft for oscillating the shaft in response to a portion of its vertical movement, said power means and said cam means together moving the shaping mold between an operative forming position and a remote inoperative position above and out of axial alignment with the operative position of the mold, a pivot block attached to said shaft for movement with the shaft, said block being axially spaced on said shaft beyond the axial travel of said mold, a torque dampening means, said torque dampening means comprising an oscillatable blade fixed to a second shaft and disposed in a cushion chamber containing a fluid together with means for controlling flow of fluid to and from said chamber, said flow controlling means including passage means in said second shaft and said cushion chamber providing communication between opposite sides of said blade, flow restricting means in said passage means for retarding flow of fluid from said chamber, a slide block attached to said second shaft, said pivot block being in sliding engagement with said slide block, oscillation of said pivot block effecting oscillation of said second shaft and the slide block, the flow restricting means cushioning rapid swinging movements of said mold holder and the mold thereon to insure accurate positioning of the mold in the operative forming position and prevent detrimental vibration of the mechanism.

2. The combination defined in claim 1, wherein the shaft of the torque dampening means is vertical and the torque dampening means comprises a stationary housing supporting the shaft for rotation, an annular chamber in said housing, a blade member attached to said shaft and housed in said chamber for annular movement therein by said shaft, channel means in said housing connecting the opposite ends of said chamber on the opposite sides of said blade member, the said chamber and channel means containing a fluid, and adjustable throttle valve means operatively connected in said channel means for restricting the flow of fluid from the chamber at one side of the blade member into the chamber at the other side of said blade member, the fluid flow dampening the rotational movements of the blade member and said shaft.

References Cited in the file of this patent

UNITED STATES PATENTS

| 1,875,202 | Aftergut | Aug. 30, 1932 |
| 1,942,832 | Piazzoli | Jan. 9, 1934 |
| 2,027,423 | Gardiner | Jan. 14, 1936 |
| 2,061,663 | Lauck | Nov. 24, 1936 |
| 2,286,516 | Swanson | June 16, 1942 |
| 2,565,749 | Zappia | Aug. 28, 1951 |
| 2,814,362 | Sweeney | Nov. 26, 1957 |
| 3,018,854 | Gies et al. | Jan. 30, 1962 |